US012682887B2

(12) United States Patent

Sung et al.

(10) Patent No.: US 12,682,887 B2
(45) Date of Patent: Jul. 14, 2026

(54) ELECTRONIC DEVICE AND METHOD OF GENERATING TEXT-TO-SPEECH MODEL FOR PROSODY CONTROL OF THE ELECTRONIC DEVICE

(71) Applicant: Samsung Electronics Co., Ltd., Gyeonggi-do (KR)

(72) Inventors: Junesig Sung, Gyeonggi-do (KR); Taehoon Kim, Gyeonggi-do (KR); Nikos Ellinas, Athens (GR); Pirros Tsiakoulis, Athens (GR); Hyoungmin Park, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 225 days.

(21) Appl. No.: 18/213,929

(22) Filed: Jun. 26, 2023

(65) Prior Publication Data

US 2023/0335112 A1 Oct. 19, 2023

Related U.S. Application Data

(63) Continuation of application No. PCT/KR2022/003710, filed on Mar. 18, 2022.

(30) Foreign Application Priority Data

Apr. 27, 2021 (KR) ........................ 10-2021-0054191

(51) Int. Cl.
*G10L 13/10* (2013.01)
*G10L 13/00* (2006.01)

(52) U.S. Cl.
CPC .................................... *G10L 13/10* (2013.01)

(58) Field of Classification Search
CPC ... G10L 13/10; G10L 13/08; G10L 2013/105; G10L 13/02; G10L 13/047; G10L 13/033;
(Continued)

(56) References Cited

U.S. PATENT DOCUMENTS 10,418,025 B2 9/2019 Shechtman et al.
2007/0112570 A1 5/2007 Kaneyasu
(Continued)

FOREIGN PATENT DOCUMENTS

JP 6729539 B2 7/2020
KR 10-1998-0082608 A 12/1998
(Continued)

OTHER PUBLICATIONS

International Search Report dated Jun. 24, 2022.
(Continued)

*Primary Examiner* — Michael Ortiz-Sanchez
(74) *Attorney, Agent, or Firm* — Sughrue Mion, PLLC

(57) ABSTRACT

According to certain embodiments, an electronic device, comprises: a memory storing therein instructions; and a processor electrically connected to the memory and configured to execute the instructions, wherein, when the instructions are executed by the processor, the processor receives training data comprising a plurality of phenomes; determines a prosody value for each one of the plurality of phenomes in the training data; clusters the plurality of phenomes based on the prosody value for each one of the plurality of phenomes in the training data, thereby resulting in a plurality of prosody clusters; extracts a phoneme sequence corresponding to a text in the training data; extracts a prosody cluster index sequence corresponding to an utterance of the text by selecting one of the plurality of clusters based on prosody values of the utterance of the text; and generates a text-to-speech (TTS) model based on the phoneme sequence and the prosody cluster index sequence.

16 Claims, 11 Drawing Sheets

(58) Field of Classification Search
CPC .. G10L 2015/025; G10L 13/027; G06F 16/35
See application file for complete search history.

(56) References Cited

U.S. PATENT DOCUMENTS

| | | | | |
|---|---|---|---|---|
| 2007/0118355 | A1 | 5/2007 | Kato et al. | |
| 2009/0204401 | A1* | 8/2009 | Bu | G10L 15/1807 704/277 |
| 2014/0052446 | A1* | 2/2014 | Mori | G10L 13/10 704/260 |
| 2015/0046164 | A1* | 2/2015 | Maganti | G10L 13/04 704/260 |
| 2016/0365085 | A1* | 12/2016 | Raghavendra | G10L 13/08 |
| 2019/0348020 | A1 | 11/2019 | Clark et al. | |
| 2020/0082807 | A1 | 3/2020 | Kim et al. | |
| 2020/0380952 | A1* | 12/2020 | Zhang | G10L 13/02 |
| 2022/0148562 | A1* | 5/2022 | Park | G10L 13/047 |

FOREIGN PATENT DOCUMENTS

| | | | | |
|---|---|---|---|---|
| KR | 10-1348906 | B1 | 1/2014 | |
| KR | 10-1735195 | B1 | 5/2017 | |
| KR | 10-2020-0015418 | A | 2/2020 | |
| WO | WO-2004070701 | A2 * | 8/2004 | G10L 13/10 |
| WO | WO-2014061230 | A1 * | 4/2014 | G10L 13/10 |

OTHER PUBLICATIONS

Sequence to Sequence Neural Speech Synthesis with Prosody Modification Capabilities Slava Shechtman, Alex Sorin IBM Research, Haifa, Israel.

* cited by examiner

ELECTRONIC DEVICE AND METHOD OF GENERATING TEXT-TO-SPEECH MODEL FOR PROSODY CONTROL OF THE ELECTRONIC DEVICE

CROSS-REFERENCE TO RELATED APPLICATIONS

This application is a continuation of International Application No. PCT/KR2022/003710, filed on Mar. 18, 2022, which is based on and claims the benefit of a Korean Patent Application No. 10-2021-0054191 filed on Apr. 27, 2021, in the Korean Intellectual Property Office, the entire disclosure of which is incorporated herein by reference for all purposes.

BACKGROUND

1. Field

The disclosure relates to an electronic device and a method of generating a text-to-speech (TTS) model for prosody control.

2. Description of Related Art

Text-to-speech (TTS) schemes that only searches for character pronunciations corresponding to an input text, generates utterances by naturally connecting the retrieved character pronunciations, has an unnatural sound. For example, the words may be individually pronounced, as if each word is spoken independently. However, the intonation and rhythms that humans use to pronounce words are dependent on previous and later words and/or the remaining words in a sentence.

SUMMARY

According to certain embodiments, an electronic device, comprises: a memory storing therein instructions; and a processor electrically connected to the memory and configured to execute the instructions, wherein, when the instructions are executed by the processor, the processor performs a plurality of operations, the plurality of operations comprising: receiving training data comprising a plurality of phonemes; determining a prosody value for each one of the plurality of phonemes in the training data; clustering the plurality of phonemes based on the prosody value for each one of the plurality of phonemes in the training data, thereby resulting in a plurality of prosody clusters; extracting a phoneme sequence corresponding to a text in the training data; extracting a prosody cluster index sequence corresponding to an utterance of the text by selecting one of the plurality of clusters based on prosody values of the utterance of the text; and generate a text-to-speech (TTS) model based on the phoneme sequence and the prosody cluster index sequence.

According to certain embodiments, an operation method of an electronic device, comprises: extracting a phoneme sequence corresponding to a text; extracting a prosody cluster index sequence corresponding to an utterance of the text by matching prosody values of the utterance to at least one of a plurality of prosody clusters, wherein each of the plurality of prosody clusters representing a prosody degree; and generating a text-to-speech (TTS) model based on the phoneme sequence and the prosody cluster index sequence.

According to certain embodiments described herein, by individually controlling prosodies of characters or phonemes constituting an input text, various TTS applications, such as, for example, the generation of prosody desired by a user or singing voice synthesis, may be implemented.

Other features and aspects will be apparent from the following detailed description, the drawings, and the claims.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
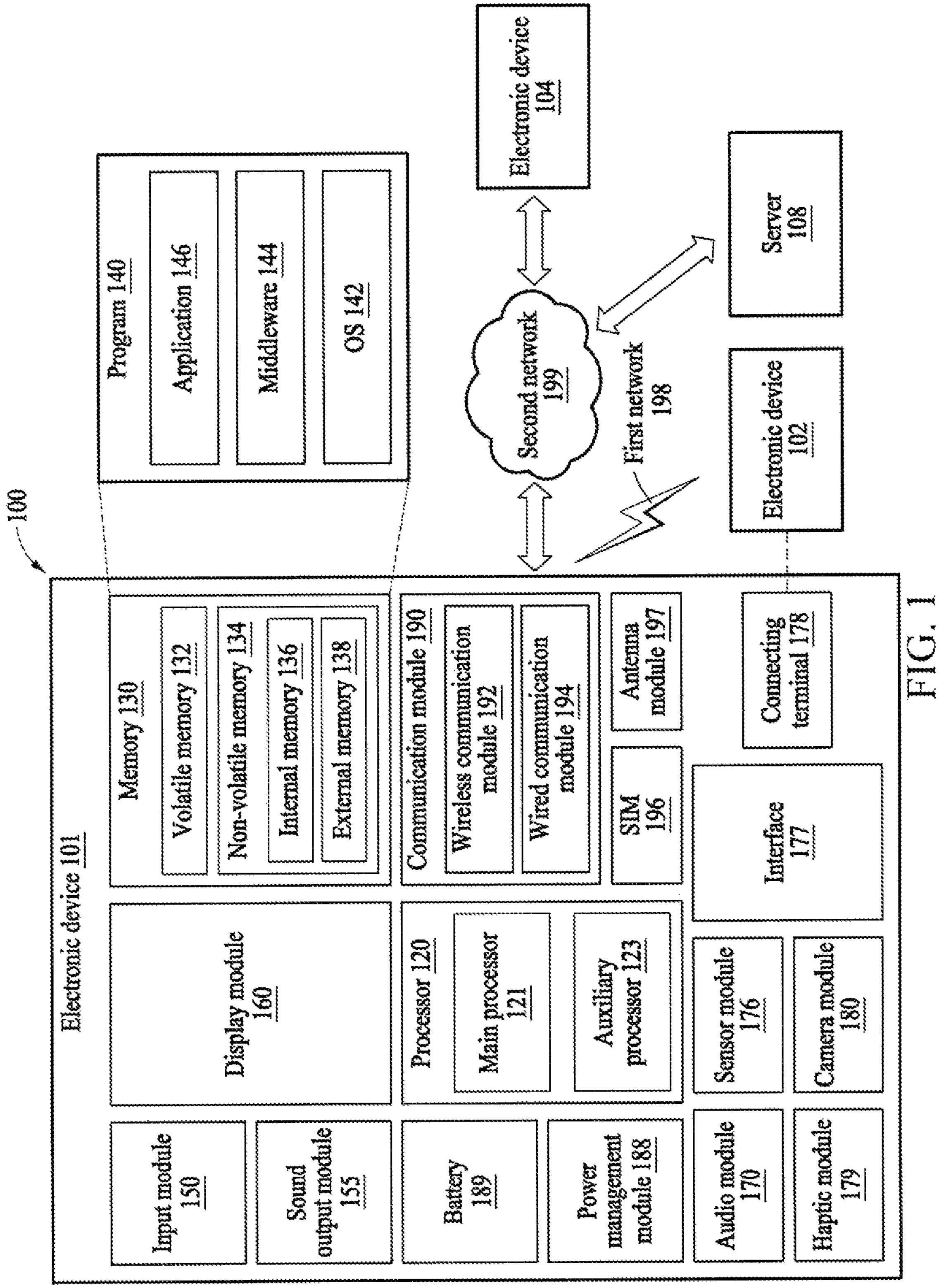
FIG. 1 is a block diagram illustrating an example electronic device in a network environment according to certain embodiments.

Hereinafter, certain embodiments will be described in greater detail with reference to the accompanying drawings. When describing the example embodiments with reference to the accompanying drawings, like reference numerals refer to like elements and a repeated description related thereto will be omitted.

Text to Speech (TTS) makes it easier for users to interface with electronic devices. For example, an electronic device can output an audio signal to the user that simulates the manner that humans communicate, rather than simply displaying text on a screen.

Moreover, deep learning technology allows TTS technology to reach the level where output sound is similar to what a human being utters or speaks. Such a deep learning-based TTS technology may be trained with data having temporal patterns based on a text to which a sample, a minimum temporal unit of a voice signal, is input, and generate a sample sequence to generate a more natural utterance and respond to a text input that is not in training data A deep learning-based text-to-speech (TTS) technology may generate only an utterance having prosody in data, and a technology for changing the prosody may be needed.

Example embodiments of the present disclosure may provide a technology for controlling the prosody of an input text by a unit of a phoneme.

However, technical aspects are not limited to the foregoing aspects, and other technical aspects may also be present. Additional aspects of embodiments of the present disclosure will be set forth in part in the description which follows and, in part, will be apparent from the description, or may be learned by practice of the disclosure.

FIG. 1 describes an electronic device 101. A user can interface with the electronic device 101 using text to speech. For example, the user can speak in the vicinity of the electronic device 101 and the audio module 170 can detect the user's speech, and convert it to a recognizable input. Additionally, although the electronic device 101 can provide outputs as text on the display module 160, the electronic device 101 can also reading the text using the audio module.

Electronic Device

FIG. 1 is a block diagram illustrating one example of an electronic device in a network environment according to certain embodiments. It shall be understood electronic devices are not limited to the following, may omit certain components, and may add other components. Referring to FIG. 1, an electronic device 101 in a network environment 100 may communicate with an electronic device 102 via a first network 198 (e.g., a short-range wireless communication network), or communicate with at least one of an electronic device 104 and a server 108 via a second network 199 (e.g., a long-range wireless communication network). The electronic device 101 may communicate with the electronic device 104 via the server 108. The electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. The processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121. The term "processor" shall be understood to refer to both the singular and plural contexts.

The auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). The auxiliary processor 123 (e.g., an ISP or a CP) may be implemented as a portion of another component (e.g., the camera module 180 or the communication module 190) that is functionally related to the auxiliary processor 123. The auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. The receiver may be implemented separately from the speaker or as a part of the speaker.

The display module 160 may visually provide information to the outside (e.g., a user) of the electronic device 101.

The display module 160 may include, for example, a display, a hologram device, or a projector, and a control circuitry to control a corresponding one of the display, the hologram device, and the projector. The display module 160 may include a touch sensor adapted to sense a touch, or a pressure sensor adapted to measure an intensity of a force incurred by the touch.

The audio module 170 may convert a sound into an electric signal or vice versa. The audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the electronic device 102) directly (e.g., wiredly) or wirelessly. The interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). The connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. The haptic module 179 may include, for to example, a motor, a piezoelectric element, or an electric stimulator.

The camera module 180 may capture a still image and moving images. The camera module 180 may include one or more lenses, image sensors, ISPs, or flashes.

The power management module 188 may manage power supplied to the electronic device 101. The power management module 188 may be implemented as, for example, at least a part of a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the electronic device 102, the electronic device 104, or the server 108) and performing communication via the established communication channel. The communication module 190 may include one or more communication processors that are operable independently of the processor 120 (e.g., an AP) and that support direct (e.g., wired) communication or wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). The wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. The antenna module 197 may include an antenna including a radiating element including a conductive material or a conductive pattern formed in or on a substrate (e.g., a printed circuit board (PCB)). The antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

The antenna module 197 may form a mmWave antenna module. The mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 and 104 may be a device of the same type as or a different type from the electronic device 101. All or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an embodiment, the external electronic device 104 may include an Internet-of-things (IoT) device. The server 108 may be an intelligent server using machine learning and/or a neural network. The external electronic device 104 or the server 108 may be included in the second network 199. The electronic device 101 may be applied to intelligent services (e.g., smart home, smart city, smart car, or healthcare) based on 5G communication technology or IoT-related technology.

An electronic device may be a device of one of various types. The electronic device may include, as non-limiting examples, a portable communication device (e.g., a smartphone, etc.), a computing device, a portable multimedia device, a portable medical device, a camera, a wearable device, or a home appliance. However, the electronic device is not limited to the foregoing examples.

It should be construed that certain embodiments of the present disclosure and the terms used therein are not intended to limit the technological features set forth herein to some particular embodiments but include various changes, equivalents, or replacements of the embodiments. In connection with the description of the drawings, like reference numerals may be used for similar or related components. It should be understood that a singular form of a noun corresponding to an item may include one or more of the things, unless the relevant context clearly indicates otherwise. As used herein, "A or B," "at least one of A and B," "at least one of A or B," "A, B, or C," "at least one of A, B, and C," and "A, B, or C," each of which may include any one of the items listed together in the corresponding one of the phrases, or all possible combinations thereof. Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure. It should also be understood that, when a component (e.g., a first component) is referred to as being "connected to" or "coupled to" another component with or without the term "functionally" or "communicatively," the component can be connected or coupled to the other component directly (e.g., wiredly), wirelessly, or via a third component.

As used in connection with certain embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in the form of an application-specific integrated circuit (ASIC).

Certain embodiments set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to certain embodiments, a method according to an embodiment of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities, and some of the multiple entities may be separately disposed in different components. According to certain embodiments, one or more of the above-described components or operations may be omitted, or one or more other components or operations may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Integrated Intelligence System

Figure 2:
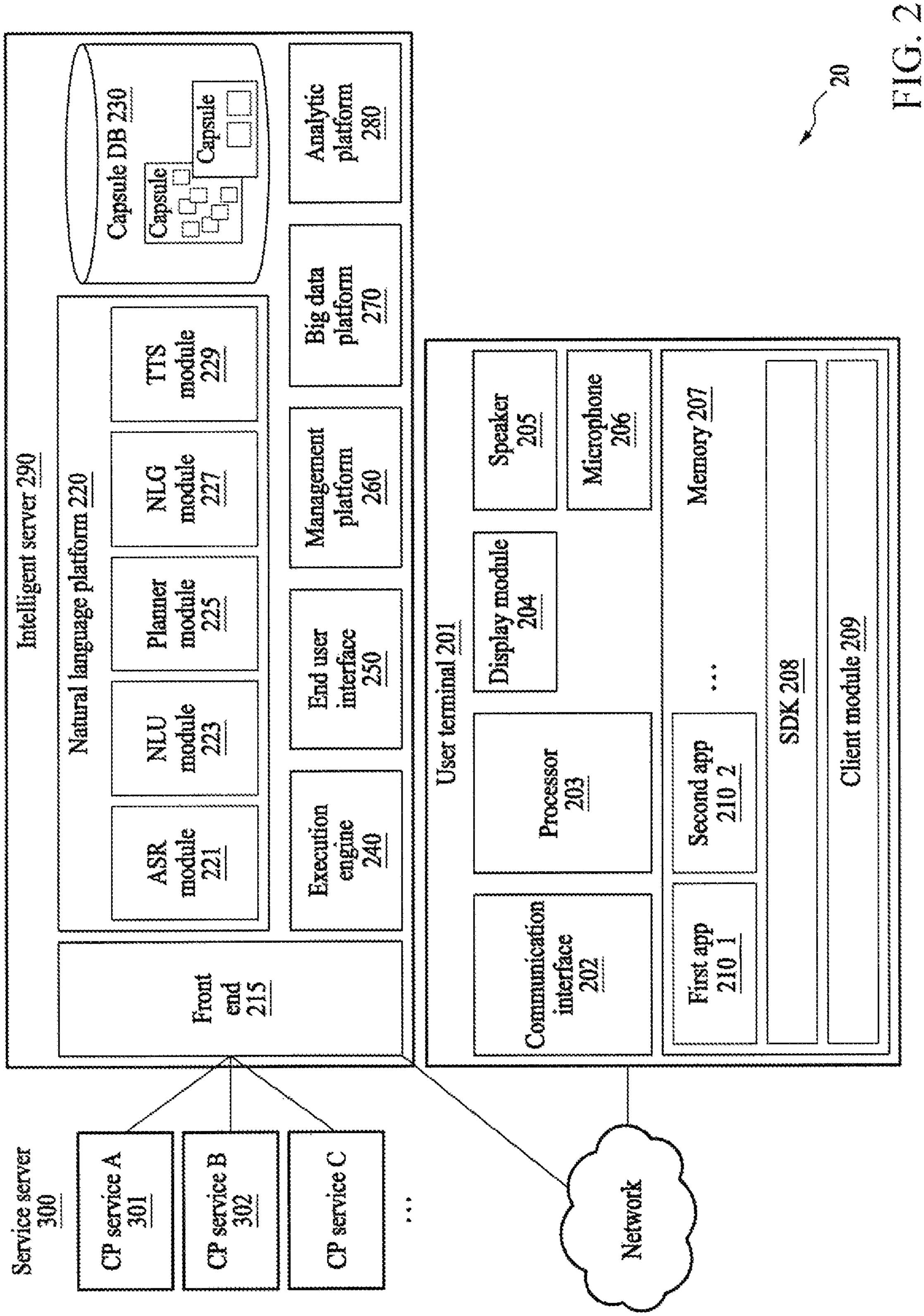
FIG. 2 is a block diagram illustrating an example integrated intelligence system according to certain embodiments.
Figure 3:
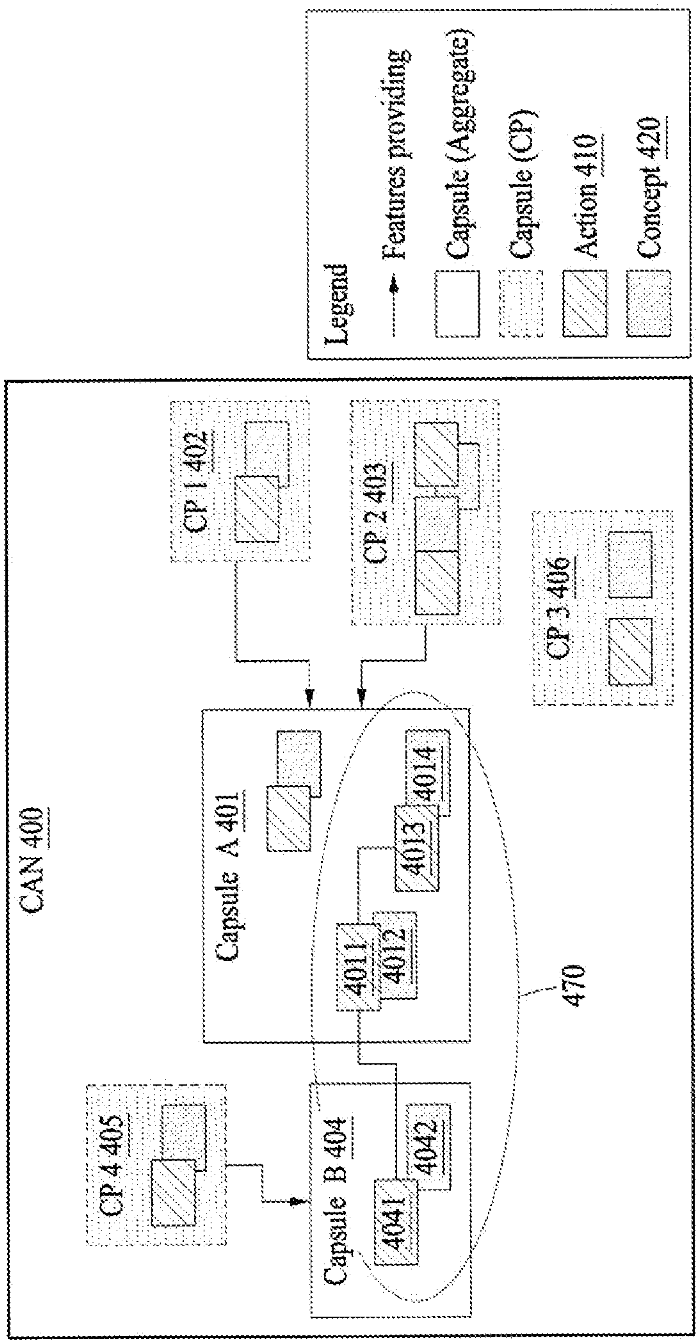
FIG. 3 is a diagram illustrating an example form in which concept and action relationship information is stored in a database (DB) according to certain embodiments.
Figure 4:
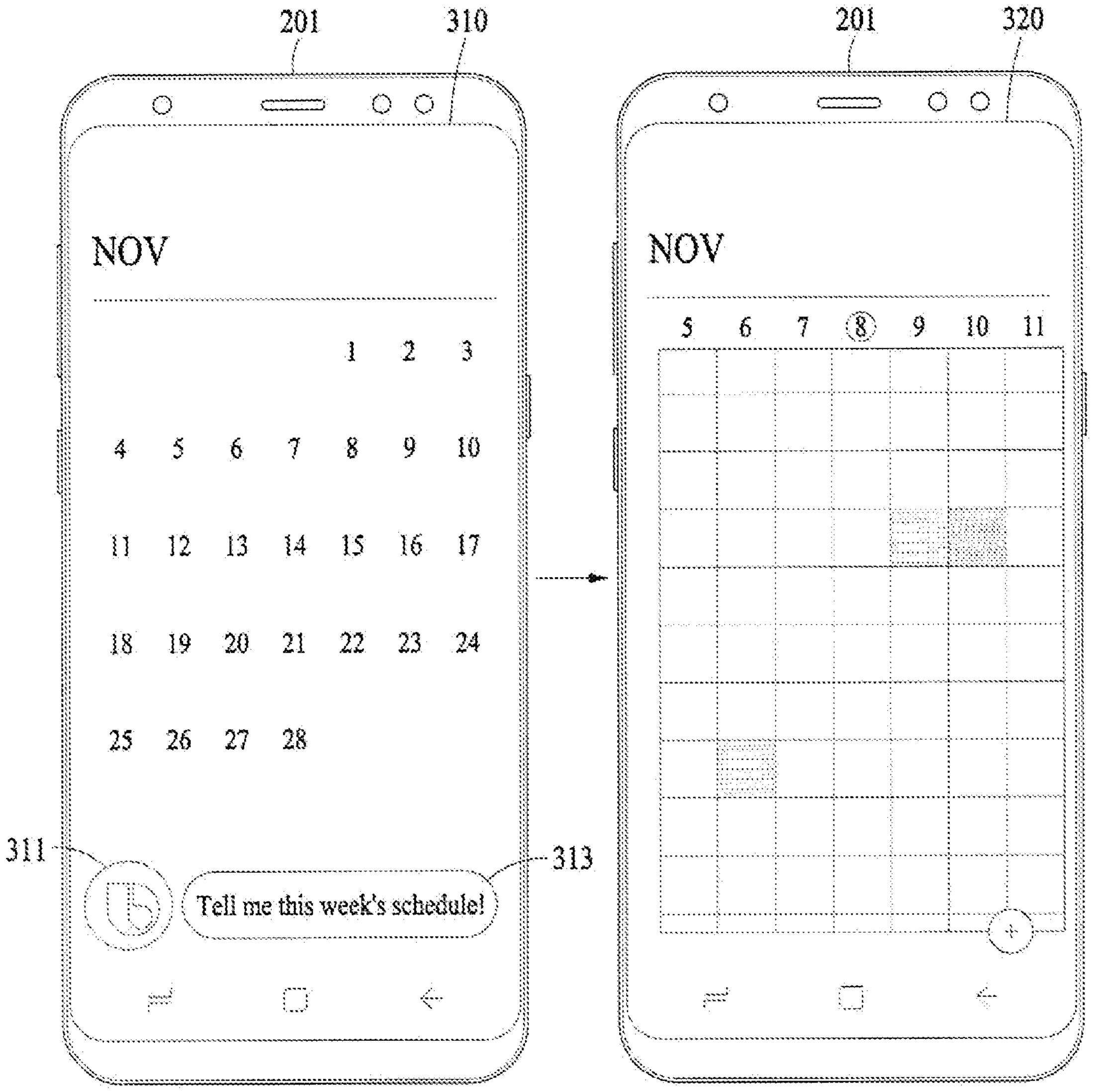
FIG. 4 is a diagram illustrating example screens showing that an electronic device processes a received voice input through an intelligent app according to certain embodiments.

As noted above, TTS allows the user to provide inputs and receive outs with the electronic device 101 in a manner that is similar to human communication. However, TTS that only searches for character pronunciations corresponding to an input text and generates utterances by naturally connecting the retrieved character pronunciations, has an unnatural sound. For example, the words may be individually pronounced, as if each word is spoken independently. However, the intonation and rhythms that humans use to pronounce words are dependent on previous and later words and/or the remaining words in a sentence. Accordingly, a deep learning-based TTS technology may be trained with data having temporal patterns based on a text to which a sample, a minimum temporal unit of a voice signal, is input, and generate a sample sequence to generate a more natural utterance and respond to a text input that is not in training data. FIGS. 2-4 are block diagrams illustrating an integrated intelligence system according to certain embodiments that can be used for deep-learning TTS.

Referring to FIG. 2, according to an embodiment, an integrated intelligence system 20 may include an electronic device 201 (e.g., the electronic device 101 of FIG. 1), an intelligent server 290 (e.g., the server 108 of FIG. 1), and a service server 300 (e.g., the server 108 of FIG. 1).

The electronic device 201 may be a terminal device (or an electronic device) that is connectable to the Internet, for example, a mobile phone, a smartphone, a personal digital assistant (PDA), a laptop computer, a television (TV), a white home appliance, a wearable device, a head-mounted display (HMD), or a smart speaker.

As illustrated, the electronic device 201 may include a communication interface 202 (e.g., the interface 177 of FIG. 1), a microphone 206 (e.g., the input module 150 of FIG. 1), a speaker 205 (e.g., the sound output module 155 of FIG. 1), a display module 204 (e.g., the display module 160 of FIG. 1), a memory 207 (e.g., the memory 130 of FIG. 1), or a processor 203 (e.g., the processor 120 of FIG. 1). The components listed above may be operationally or electrically connected to each other.

The communication interface 202 may be connected to an external device to transmit and receive data to and from the external device. The microphone 206 may receive a sound (e.g., a user utterance) and convert the sound into an electrical signal. The speaker 205 may output the electrical signal as a sound (e.g., a voice or speech).

The display module 204 may display an image or video. The display module 204 may also display a graphical user interface (GUI) of an app (or an application program) being executed. The display module 204 may receive a touch input through a touch sensor. For example, the display module 204 may receive a text input through the touch sensor in an on-screen keyboard area displayed on the display module 204.

The memory 207 may store a client module 209, a software development kit (SDK) 208, and a plurality of apps 210. The client module 209 and the SDK 208 may configure a framework (or a solution program) for performing general-purpose functions. In addition, the client module 209 or the SDK 208 may configure a framework for processing a user input (e.g., a voice input, a text input, and a touch input).

The apps 210 stored in the memory 207 may be programs for performing designated functions. The apps 210 may include a first app 210_1, a second app 210_2, and the like. The apps 210 may each include a plurality of actions for performing a designated function. For example, the apps 210 may include an alarm app, a message app, and/or a scheduling app. The apps 210 may be executed by the processor 203 to sequentially execute at least a portion of the actions.

The processor 203 may control the overall operation of electronic device 201. For example, the processor 203 may be electrically connected to the communication interface 202, the microphone 206, the speaker 205, and the display module 204 to perform a designated operation.

The processor 203 may also perform a designated function by executing a program stored in the memory 207. For example, the processor 203 may execute at least one of the client module 209 or the SDK 208 to perform the following operations for processing a user input. For example, the processor 203 may control the actions of the apps 210 through the SDK 208. The following operations described as operations of the client module 209 or the SDK 208 may be operations to be performed by the execution of the processor 203.

The client module 209 may receive a user input. For example, the client module 209 may receive a voice signal corresponding to a user utterance sensed through the microphone 206. Alternatively, the client module 209 may receive a touch input sensed through the display module 204. Alternatively, the client module 209 may receive a text input sensed through a keyboard or an on-screen keyboard. The client module 209 may also receive, as non-limiting examples, various types of user input sensed through an input module included in the electronic device 201 or an input module connected to the electronic device 201. The client module 209 may transmit the received user input to the intelligent server 290. The client module 209 may transmit state information of the electronic device 201 together with the received user input to the intelligent server 290. The state information may be, for example, execution state information of an app.

The client module 209 may also receive a result corresponding to the received user input. For example, when the intelligent server 290 is capable of calculating the result corresponding to the received user input, the client module 209 may receive the result corresponding to the received user input. The client module 209 may display the received result on the display module 204, and output the received result in audio through the speaker 205.

The client module 209 may receive a plan corresponding to the received user input. The client module 209 may display, on the display module 204, execution results of executing a plurality of actions of an app according to the plan. For example, the client module 209 may sequentially display the execution results of the actions on the display module 204, and output the execution results in audio through the speaker 205. For another example, electronic device 201 may display only an execution result of executing a portion of the actions (e.g., an execution result of the last action) on the display module 204, and output the execution result in audio through the speaker 205.

The client module 209 may receive a request for obtaining information necessary for calculating the result corresponding to the user input from the intelligent server 290. The client module 209 may transmit the necessary information to the intelligent server 290 in response to the request.

The client module 209 may transmit information on the execution results of executing the actions according to the plan to the intelligent server 290. The intelligent server 290 may verify that the received user input has been correctly processed using the information.

The client module 209 may include a speech recognition module. The client module 209 may recognize a voice input for performing a limited function through the speech recognition module. For example, the client module 209 may execute an intelligent app for processing a voice input to perform an organic action through a designated input (e.g., Wake up!).

The intelligent server 290 may receive information related to a user voice input from the electronic device 201 through a communication network. The intelligent server 290 may change data related to the received voice input into text data. The intelligent server 290 may generate a plan for performing a task corresponding to the user input based on the text data.

The plan may be generated by an artificial intelligence (AI) system. The AI system may be a rule-based system or a neural network-based system (e.g., a feedforward neural network (FNN) or a recurrent neural network (RNN)). Alternatively, the AI system may be a combination thereof or another AI system. The plan may also be selected from a set of predefined plans or may be generated in real time in response to a user request. For example, the AI system may select at least one plan from among the predefined plans.

The intelligent server 290 may transmit a result according to the generated plan to the electronic device 201 or transmit the generated plan to the electronic device 201. The electronic device 201 may display the result according to the plan on the display module 204. The electronic device 201 may display a result of executing an action according to the plan on the display module 204.

The intelligent server 290 may include a front end 215, a natural language platform 220, a capsule database (DB) 230, an execution engine 240, an end user interface 250, a management platform 260, a big data platform 270, or an analytic platform 280.

The front end 215 may receive a user input from the electronic device 201. The front end 215 may transmit a response corresponding to the user input.

The natural language platform 220 may include an automatic speech recognition (ASR) module 221, a natural language understanding (NLU) module 223, a planner module 225, a natural language generator (NLG) module 227, or a text-to-speech (TTS) module 229.

The ASR module 221 may convert a voice input received from the electronic device 201 into text data. The NLU module 223 may understand an intention of a user using the text data of the voice input. For example, the NLU module 223 may understand the intention of the user by performing a syntactic or semantic analysis on a user input in the form of text data. The NLU module 223 may understand semantics of a word extracted from the user input using a linguistic feature (e.g., a grammatical element) of a morpheme or phrase, and determine the intention of the user by matching the semantics of the word to the intention.

The planner module 225 may generate a plan using the intention and a parameter determined by the NLU module 223. The planner module 225 may determine a plurality of domains required to perform a task based on the determined intention. The planner module 225 may determine a plurality of actions included in each of the domains determined based on the intention. The planner module 225 may determine a parameter required to execute the determined actions or a resulting value output by the execution of the actions. The parameter and the resulting value may be defined as a concept of a designated form (or class). Accordingly, the plan may include a plurality of actions and a plurality of concepts determined by a user intention. The planner module 225 may determine a relationship between the actions and the concepts stepwise (or hierarchically). For example, the planner module 225 may determine an execution order of the actions determined based on the user intention, based on the concepts. In other words, the planner module 225 may determine the execution order of the actions based on the parameter required for the execution of the actions and results output by the execution of the actions. Accordingly, the planner module 225 may generate the plan including connection information (e.g., ontology) between the actions and the concepts. The planner module 225 may generate the plan using information stored in the capsule DB 230 that stores a set of relationships between concepts and actions.

The NLG module 227 may change designated information to the form of a text. The information changed to the form of a text may be in the form of a natural language utterance. The TTS module 229 may change the information in the form of a text to information in the form of a speech.

According to an embodiment, all or some of the functions of the natural language platform 220 may also be implemented in the electronic device 201.

The capsule DB 230 may store therein information about relationships between a plurality of concepts and a plurality of actions corresponding to a plurality of domains. According to an embodiment, a capsule may include a plurality of action objects (or action information) and concept objects (or concept information) included in a plan. The capsule DB 230 may store a plurality of capsules in the form of a concept action network (CAN). The capsules may be stored in a function registry included in the capsule DB 230.

The capsule DB 230 may include a strategy registry that stores strategy information necessary for determining a plan corresponding to a user input, for example, a voice input. The strategy information may include reference information for determining one plan when there are a plurality of plans corresponding to the user input. The capsule DB 230 may include a follow-up registry that stores information on follow-up actions for suggesting a follow-up action to the user in a designated situation. The follow-up action may include, for example, a follow-up utterance. The capsule DB 230 may include a layout registry that stores layout information of information output through the electronic device 201. The capsule DB 230 may include a vocabulary registry that stores vocabulary information included in capsule information. The capsule DB 230 may include a dialog registry that stores information on a dialog (or an interaction) with the user. The capsule DB 230 may update the stored objects through a developer tool. The developer tool may include, for example, a function editor for updating an action object or a concept object. The developer tool may include a vocabulary editor for updating a vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a currently set objective, a preference of the user, or an environmental condition. The capsule DB 230 may also be implemented in the electronic device 201.

The execution engine 240 may calculate a result using a generated plan. The end user interface 250 may transmit the calculated result to the electronic device 201. Accordingly, the electronic device 201 may receive the result and provide the received result to the user. The management platform 260 may manage information used by the intelligent server 290. The big data platform 270 may collect data of the user. The analytic platform 280 may manage a quality of service (QoS) of the intelligent server 290. For example, the analytic platform 280 may manage the components and processing rate (or efficiency) of the intelligent server 290.

The service server 300 may provide a designated service (e.g., food ordering or hotel reservation) to the electronic device 201. The service server 300 may be a server operated by a third party. The service server 300 may provide the intelligent server 290 with information to be used for generating a plan corresponding to a received user input. The provided information may be stored in the capsule DB 230. In addition, the service server 300 may provide resulting information according to the plan to the intelligent server 290.

In the integrated intelligence system 20 described above, the electronic device 201 may provide various intelligent services to a user in response to a user input. The user input may include, for example, an input through a physical button, a touch input, or a voice input.

The electronic device 201 may provide a speech recognition service through an intelligent app (or a speech recognition app) stored therein. In this case, the electronic device 201 may recognize a user utterance or a voice input received through the microphone 206, and provide a service corresponding to the recognized voice input to the user.

The electronic device 201 may perform a designated action alone or together with the intelligent server 290 and/or the service server 300 based on the received voice input. For example, the electronic device 201 may execute an app corresponding to the received voice input and perform the designated action through the executed app.

When the electronic device 201 provides the service together with the intelligent server 290 and/or the service server 300, the electronic device 201 may detect a user utterance using the microphone 206 and generate a signal (or voice data) corresponding to the detected user utterance. The electronic device 201 may transmit the voice data to the intelligent server 290 using the communication interface 202.

The intelligent server 290 may generate, as a response to the voice input received from the electronic device 201, a plan for performing a task corresponding to the voice input or a result of performing an action according to the plan. The plan may include, for example, a plurality of actions for performing the task corresponding to the voice input of the user, and a plurality of concepts related to the actions. The concepts may define parameters input to the execution of the actions or resulting values output by the execution of the actions. The plan may include connection information between the actions and the concepts.

The electronic device 201 may receive the response using the communication interface 202. The electronic device 201 may output a voice signal generated in the electronic device 201 to the outside using the speaker 205, or output an image generated in the electronic device 201 to the outside using the display module 204.

FIG. 3 is a diagram illustrating an example form in which concept and action relationship information is stored in a DB according to certain embodiments.

A capsule DB (e.g., the capsule DB 230 of FIG. 2) of an intelligent server (e.g., the intelligent server 290 of FIG. 2) may store therein capsules in the form of a concept action network (CAN) 400. The capsule DB may store, in the form of the CAN 400, actions for processing a task corresponding to a voice input of a user and parameters necessary for the actions.

The capsule DB may store a plurality of capsules, for example, a capsule A 401 and a capsule B 404, respectively corresponding to a plurality of domains (e.g., applications). One capsule (e.g., the capsule A 401) may correspond to one domain (e.g., a location (geo) application). In addition, one capsule may correspond to at least one service provider (e.g., CP1 402 or CP2 403) for performing a function for a domain related to the capsule. One capsule may include at least one action 410 and at least one concept 420 for performing a designated function.

A natural language platform (e.g., the natural language platform 220 of FIG. 2) may generate a plan for performing a task corresponding to a received voice input using the capsules stored in the capsule DB. For example, a planner module (e.g., the planner module 225 of FIG. 2) of the natural language platform may generate the plan using the capsules stored in the capsule DB. For example, the planner module may generate a plan 470 using actions 4011 and 4013 and concepts 4012 and 4014 of the capsule A 401 and using an action 4041 and a concept 4042 of the capsule B 404.

FIG. 4 is a diagram illustrating example screens showing that an electronic device processes a received voice input through an intelligent app according to certain embodiments.

Referring to FIG. 4, an electronic device 201 may execute an intelligent app to process a user input through an intelligent server (e.g., the intelligent server 290 of FIG. 2).

According to an embodiment, on a first screen 310, when a designated voice input (e.g., Wake up!) is recognized or an input through a hardware key (e.g., a dedicated hardware key) is received, the electronic device 201 may execute the intelligent app for processing the voice input. The electronic device 201 may execute the intelligent app, for example, while a scheduling app is being executed. The electronic device 201 may display an object (e.g., an icon) 311 corresponding to the intelligent app on a display (e.g., the display module 204 of FIG. 2). The electronic device 201 may receive a voice input made by a user utterance. For example, the electronic device 201 may receive a voice input "Tell me this week's schedule!." The electronic device 201 may display, on the display module, a user interface (UI) 313 (e.g., an input window) of the intelligent app in which text data of the received voice input is displayed.

According to an embodiment, on a second screen 320, the electronic device 201 may display, on the display module, a result corresponding to the received voice input. For example, the electronic device 201 may receive a plan corresponding to a received user input and display, on the display module, "this week's schedule" according to the plan.

Deep learning technology allows TTS technology to reach the level where output sound is similar to what a human being utters or speaks. Such a deep learning-based TTS technology may be trained with data having temporal patterns based on a text to which a sample, a minimum temporal unit of a voice signal, is input, and generate a sample sequence to generate a more natural utterance and respond to a text input that is not in training data. However, a deep learning-based text-to-speech (TTS) technology may generate only an utterance having prosody in data. Accordingly, an apparatus and method that may change the prosody according to certain embodiments, is described below.

Figure 5:
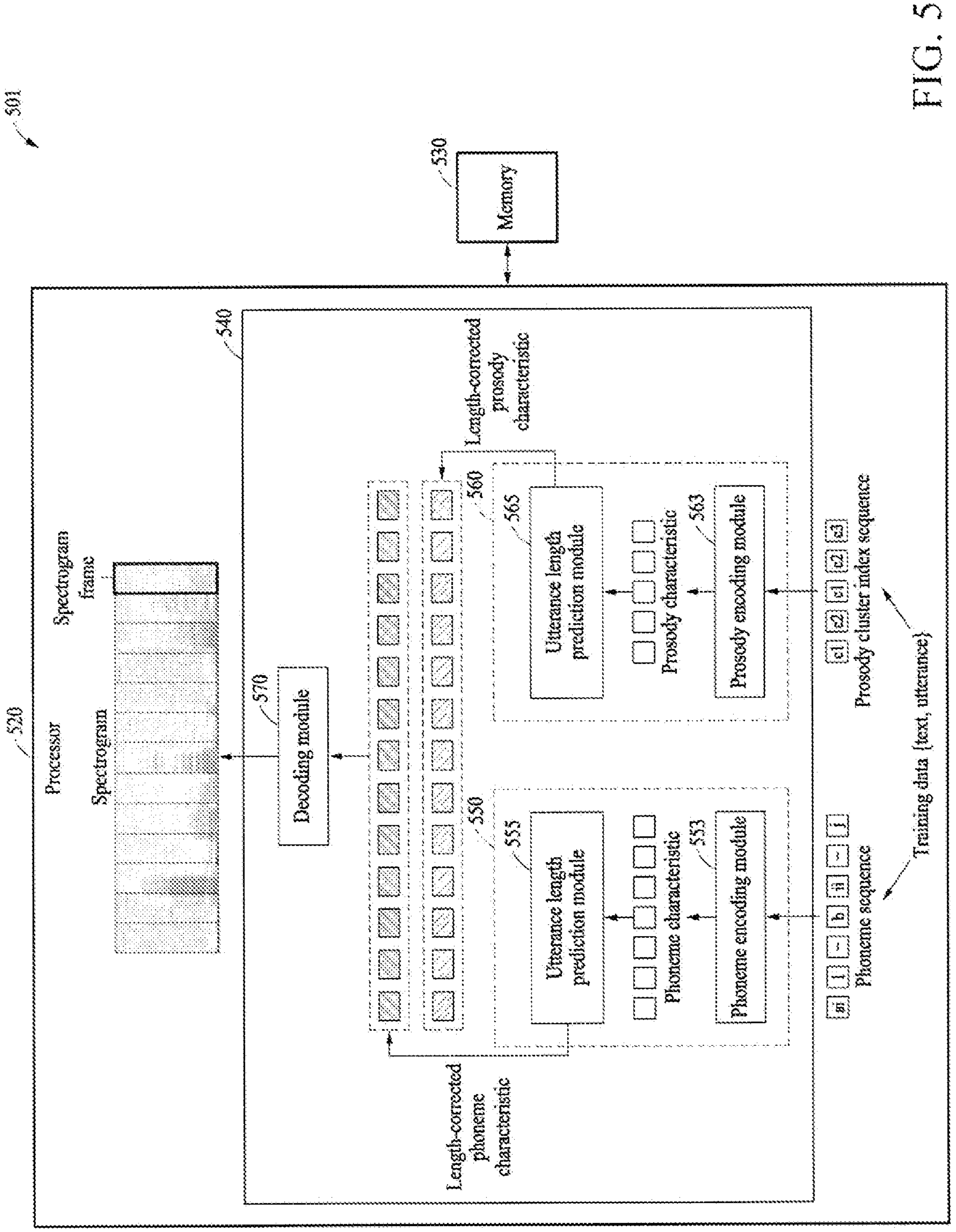
FIG. 5 is a diagram illustrating an example electronic device for generating a text-to-speech (TTS) model according to certain embodiments.

FIG. 5 is a diagram illustrating an example electronic device for generating a TTS model according to certain embodiments.

Referring to FIG. 5, according to an embodiment, an electronic device 501 (e.g., the electronic device 101 of FIG. 1, the electronic device 201 of FIG. 2, or the intelligent server 290 of FIG. 2) may include at least one processor 520 (e.g., the processor 120 of FIG. 1 or the processor 203 of FIG. 2) and a memory 530 (e.g., the memory 130 of FIG. 1 or the memory 207 of FIG. 2) electrically connected to the processor 520. The memory 530 may be executable by the processor 520, and may store instructions that allow the processor 520 to generate (or train) a TTS model 540 configured to control prosody (e.g., utterance length, tone pitch (high and low), size, speed, accent, intonation, etc.) by a unit of a phoneme. The memory 530 may also store the TTS model 540.

The processor 520 may obtain training data. The training data may comprise a plurality of phonemes. The plurality of phonemes can be clustered based on a prosody value for each one of the plurality of phonemes, thereby resulting in a plurality of prosody clusters.

The processor 520 may obtain training data. The training data may comprise a plurality of phenomes. The plurality of phenomes can be clustered based on a prosody value for each one of the plurality of phenomes, thereby resulting in a plurality of prosody clusters.

The training data may include at least one pair of a text (e.g., a sentence and a character string) and an utterance of the text (e.g., utterance data). The utterance data may include a recording of a person reading the text. To better train the TTS model 540, a large number of text/utterance pairs may be collected.

The processor 520 may extract a phoneme sequence from or corresponding to a text. When extracting the phoneme sequence corresponding to the text, the processor 520 may consider a language of the text and characters constituting the text. The processor 520 may convert the text into the phoneme sequence based on characteristics of the language (or linguistic characteristics) of the text and a relationship between the characters constituting the text.

Each of the plurality of phonemes can be associated with a portion of the utterance of the text. That is the portion of the utterance of the text is that portion which where the phoneme is uttered. The prosody value of each phoneme can be determined by calculating various properties of that portion of the utterance where the phoneme is uttered, such as pitch, and energy. The plurality of phoneme can then be clustered.

The processor 520 may extract a prosody cluster index sequence corresponding to the utterance of the text. The prosody cluster index sequence may be used to train a prosody model 560 included in the TTS model 540. The processor 520 may extract the prosody cluster index sequence using a plurality of predetermined prosody clusters. For example, each cluster may include prosody values at a similar level and represent a degree of prosody. For example, the processor 520 may extract the prosody cluster index corresponding to the utterance of the text by determining a cluster to which prosody values of the utterance of the text belongs from among the prosody clusters.

The TTS model 540 may include a phoneme model 550, the prosody model 560, and a decoding module 570. The processor 520 may train the phoneme model 550, the prosody model 560, and the decoding module 570. The processor 520 may train the phoneme model 550 with phonemes by inputting the phoneme sequence corresponding to the text to the phoneme model 550, and train the prosody model 560 with prosody in parallel or independently by inputting the prosody cluster index sequence to the prosody model 560. The phoneme sequence may be used as an input of the phoneme model 550 such that the phoneme model 550 learns a hierarchical structure and/or sequential structure of the phoneme sequence. The prosody cluster index sequence may be used as an input of the prosody model 560 such that the prosody model 560 learns a hierarchical structure between prosodies and/or results (e.g., an output of the prosody model 560).

The processor 520 may train the phoneme model 550 with phonemes by inputting the to phoneme sequence corresponding to the text to the phoneme model 550. The phoneme model 550 may include a phoneme encoding module 553 and an utterance length prediction module 555. The phoneme encoding module 553 may extract phoneme characteristics (e.g., linguistic information) from the input phoneme sequence, and output the phoneme characteristics to the utterance length prediction module 555. The phoneme characteristics may be characteristics significant to generate pronunciations of phonemes extracted from a relationship and order between the phonemes. The utterance length prediction module 555 may predict a length of a spectrogram frame affected by each phoneme characteristic, and correct a phoneme characteristic (e.g., length) based on a result of the prediction. For example, the utterance length prediction module 555 may output a length-corrected phoneme characteristic to the decoding module 570.

The processor 520 may train the prosody model 560 with prosody by inputting the prosody cluster index sequence to the prosody model 560. The prosody model 560 may include a prosody encoding module 563 and an utterance length prediction module 565. The prosody encoding module 563 may extract prosody characteristics including useful prosody information from the input prosody cluster index sequence, and output the prosody characteristics to the utterance length prediction module 565. The utterance length prediction module 565 may predict a length of a spectrogram frame affected by each prosody characteristic, and correct a prosody characteristic (e.g., length) based on a result of the prediction. For example, the utterance length prediction module 565 may output a length-corrected prosody characteristic to the decoding module 570.

The processor 520 may train the decoding module 570 by inputting, to the decoding module 570, a value (e.g., the length-corrected phoneme characteristic) output from the phoneme model 550 and a value (e.g., the length-corrected prosody characteristic) output from the prosody model 560. The decoding module 570 may convert the length-corrected phoneme characteristic and the length-corrected prosody characteristic into spectrogram frames, and combine the spectrogram frames to generate a spectrogram. The spectrogram generated by the decoding module 570 may be one that is generated using both the length-corrected phoneme characteristic and the length-corrected prosody characteristic, and may thus include information on an utterance corresponding to a phoneme to which desired prosody is applied.

When predicting a length of each spectrogram frame, the phoneme characteristics and the prosody characteristics may be separately calculated and corrected through independent models (e.g., the phoneme model 550 and the prosody model 560), and then be combined in the decoding module 570 to be used to train the TTS model 540. Accordingly, in the TTS model 540, dependency between phonemes and prosody may be minimized, and the TTS model 540 may generate an utterance in which a desired prosody characteristic is reflected.

Both the value output from the phoneme model 550 and the value output from the prosody model 560 may be input to the decoding module 570, and the spectrogram which is a final utterance result may be output from the decoding module 570. The processor 520 may adjust a weight (e.g., a training weight) of each of the components (e.g., 550 through 570) of the TTS model 540 using a backpropagation algorithm suitable for the training of the TTS model 540 based on an error value between the final utterance result and an actual correct answer, and repeat the foregoing operations a sufficient number of times to learn the entire training data. The processor 520 may thereby increase the performance of the TTS model 540.

The generated TTS model 540 (e.g., the trained TTS model 540) may control the prosody of the text (e.g., an input text) in more detail by a unit of a phoneme. The TTS model 540 may individually (or independently) control the prosody of characters, words, or phonemes constituting the text, in addition to the entire text, thereby generating an utterance (e.g., an utterance of the text) with prosody desired by a user. The TTS model 540 may be implemented or used in various TTS applications, such as, for example, generation of expressive utterances (e.g., utterances that emphasize specific portions of a text, or natural utterances) or singing voice synthesis, by controlling in detail prosody.

Figure 6:
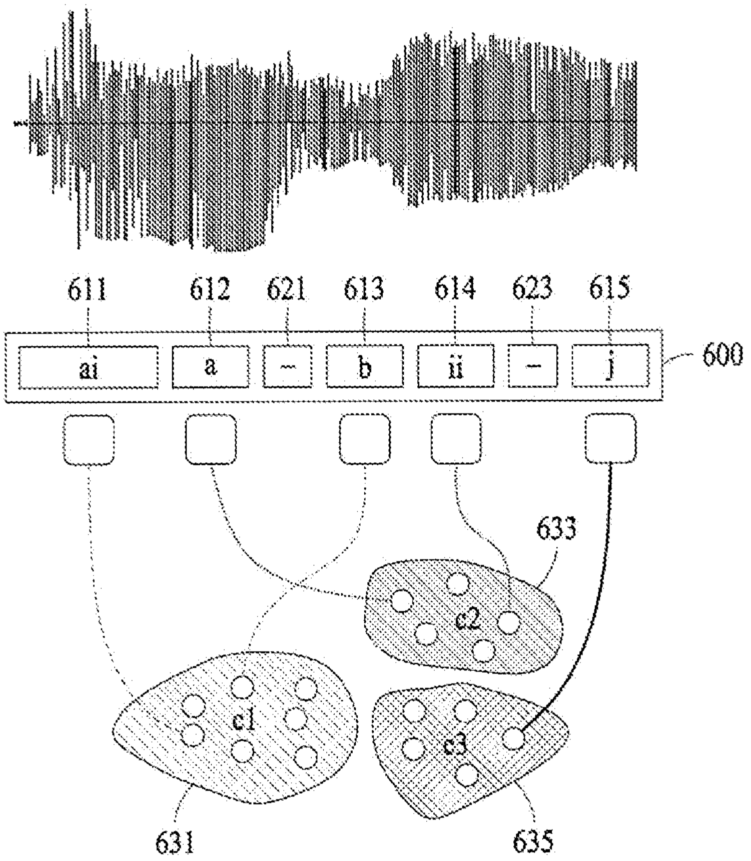
FIG. 6 is a diagram illustrating an example prosody clustering operation performed by an electronic device according to certain embodiments.

FIG. 6 is a diagram illustrating an example prosody clustering operation performed by an electronic device according to certain embodiments.

Referring to FIG. 6, according to an embodiment, a TTS model (e.g., the TTS model 540 of FIG. 5) may reduce dependency that may occur between phonemes and prosody, using a prosody model (e.g., the prosody model 560 of FIG. 5) configured to independently learn prosody, in addition to a phoneme model (e.g., the phoneme model 550 of FIG. 5) configured to learn phonemes. For the learning of the prosody model 560, a prosody value may not be directly used, but a prosody cluster index sequence may be used.

A processor (e.g., the processor 520 of FIG. 5) may extract (or measure) prosody values of all phonemes from all utterances of training data. The prosody values may include prosody values extracted for all the phonemes for each prosody. For example, the processor 520 may measure prosody values by calculating an utterance length value of each phoneme from the training data, and may calculate an utterance pitch value of each phoneme during a corresponding utterance length. The utterance pitch value may be a value of an average utterance pitch during the corresponding utterance length. In certain embodiments, the processor 520 may calculate the utterance energy level (volume) during the corresponding utterance length.

The processor 520 may determine a plurality of prosody clusters representing a prosody degree by performing clustering on all the phonemes from a distribution of the prosody values of all the phonemes. The processor 520 may perform clustering on the prosody values of all the phonemes extracted for each prosody using an unsupervised machine learning method (e.g., a K-means clustering algorithm). For example, a plurality of prosody clusters may be provided for each prosody.

FIG. 6 illustrates an example of clustering of utterance length values of phonemes constituting a single utterance. As illustrated, an utterance 600 may include five phonemes 611 through 615 and two spaces 621 and 623. The processor 520 may group the phonemes 611 and 613 into a prosody cluster c1 631 (which represents a low speed), the phonemes 612 and 614 into a prosody cluster c2 633 (which represents a middle speed), and the phoneme 615 into a prosody cluster c3 635 (which represents a high speed), based on a distribution of utterance length values of the phonemes 611 through 615. A plurality of quantized prosody clusters may be generated for each prosody, and a prosody degree may be replaced with a cluster prosody index.

The extracted prosody values may be classified into a finite number of prosody clusters to use prosody cluster indices for training or learning, and the prosody model 560 may be induced to learn only a relationship between a limited number of prosody clusters and results, instead of a relationship between all prosody values and results, and to readily generate a relatively accurate result.

Figure 7A:
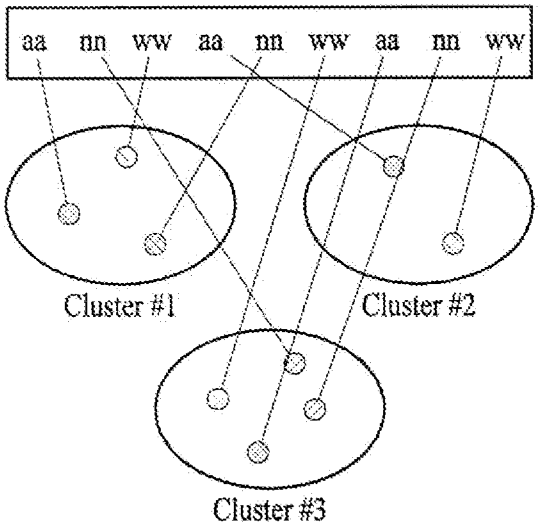
FIGS. 7A and 7B are diagrams illustrating another example prosody clustering operation performed by an electronic device according to certain embodiments.
Figure 7B:
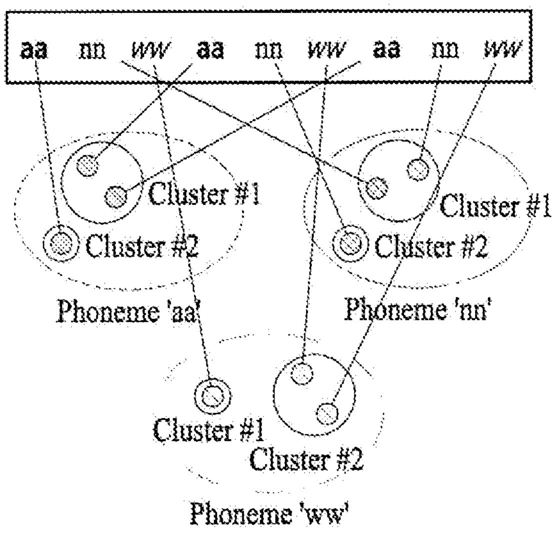

FIGS. 7A and 7B are diagrams illustrating another example prosody clustering operation performed by an electronic device according to certain embodiments.

Referring to FIGS. 7A and 7B, according to an embodiment, the processor 520 may perform clustering on all phonemes differently based on prosody characteristics. Prosody may be classified into prosody in which a distribution (e.g., a distribution of prosody values) is similar and prosody in which the distribution is greatly different, based on phonemes. For example, in a case of an utterance length when a Korean language is uttered, there may mainly be a long pronounced one and a short pronounced one for each phoneme. A pitch may be prosody that does not vary depending on phonemes, and an utterance length may be prosody in which the distribution varies greatly for each phoneme.

For example, when first prosody has a similar distribution based on phonemes, the processor 520 may perform clustering on values of the first prosody among prosody values of all the phonemes, regardless of the phonemes. FIG. 7A illustrates clustering of prosody having the same pitch with a similar distribution of values based on phonemes. The processor 520 may perform clustering using all pitch values extracted from the phonemes.

When second prosody has a distribution that varies greatly depending on the phonemes, the processor 520 may perform clustering on values of the second prosody among the prosody values of all the phonemes by classifying the values of the second prosody for each phoneme. FIG. 7B illustrates clustering of prosody such as an utterance length of which a distribution of values varies greatly depending on phonemes. The processor 520 may perform clustering only on utterance length values of a phoneme “aa” and determine prosody clusters corresponding to the phoneme “aa.” The processor 520 may perform clustering only on utterance length values of a phoneme “nn” and determine prosody clusters corresponding to the phoneme “nn.” In addition, the processor 520 may perform clustering only on utterance length values of a phoneme "ww" and determine prosody clusters corresponding to the phoneme "ww." Thus, when training the prosody model 560 or generating an utterance using the TTS model 540, only a prosody cluster corresponding to a target phoneme may be used.

Figure 8:
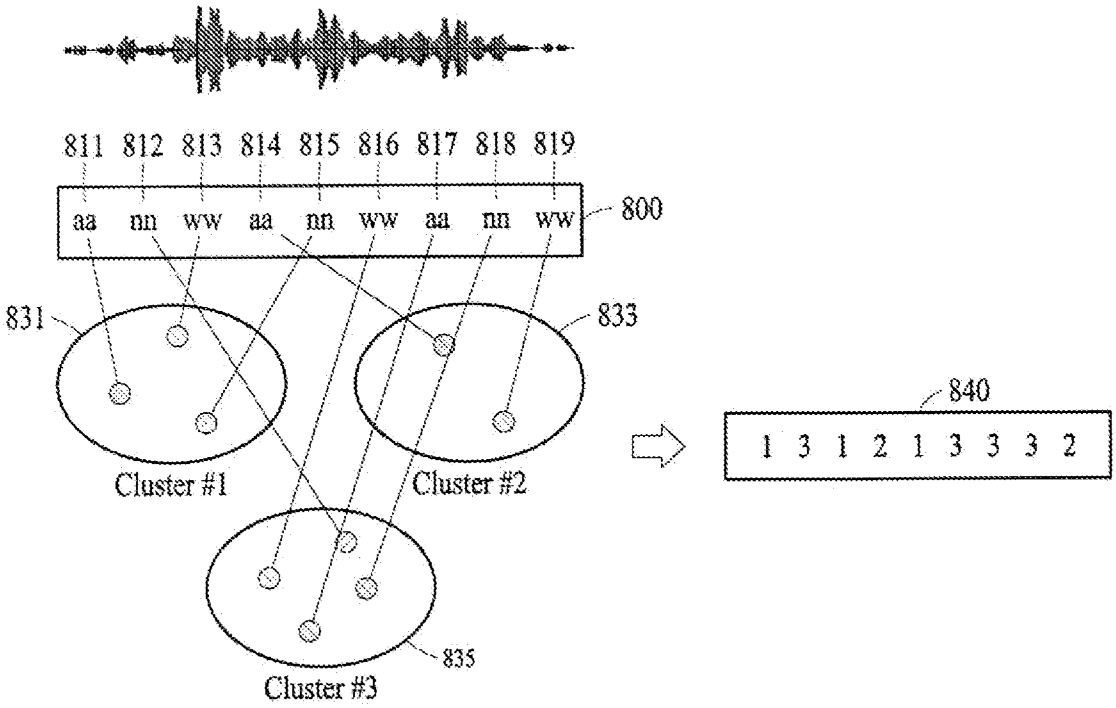
FIG. 8 is a diagram illustrating an example operation of extracting a prosody cluster index sequence by an electronic device according to certain embodiments.

FIG. 8 is a diagram illustrating an example operation of extracting a prosody cluster index sequence by an electronic device according to certain embodiments.

Referring to FIG. 8, according to an embodiment, after clustering is completed for each prosody, the processor 520 may extract a prosody cluster index sequence corresponding to an utterance of a text included in training data, using a plurality of prosody clusters. After performing the clustering, the processor 520 may re-extract prosody values of the utterance of the text to extract the prosody cluster index sequence.

The processor 520 may select a prosody cluster closest to each of the prosody values of the utterance from among the prosody clusters based on the prosody values of the utterance of the text. In this case, the processor 520 may determine a cluster to which each of the prosody values of the utterance belongs from among the prosody clusters, using a K-means clustering algorithm. For example, the processor 520 may match a prosody value to a prosody cluster to which a greatest number of K prosody values closest to the prosody value belong. Each of all phonemes in the training data may have an index (e.g., a prosody cluster index) of a prosody cluster closest to a prosody value (e.g., prosody information) of each phoneme. Accordingly, the processor 520 may extract a prosody cluster index sequence corresponding to utterances of all texts included in the training data.

FIG. 8 illustrates an example prosody cluster index sequence extracted from a single utterance. For the convenience of description, it is assumed that an utterance 800 includes nine phonemes 811 through 819, and indices of prosody clusters 831, 833, and 835 are 1, 2, and 3, respectively. Prosody values of the phonemes 811, 813, and 815 may correspond to the prosody cluster 831. Prosody values of the phonemes 814 and 819 may correspond to the prosody cluster 833. Prosody values of the phonemes 812, 816, 817, and 818 may correspond to the prosody cluster 835. A prosody cluster index sequence 840 corresponding to the utterance 800 may be extracted as $\{1, 3, 1, 2, 1, 3, 3, 3, 2\}$.

Figure 9:
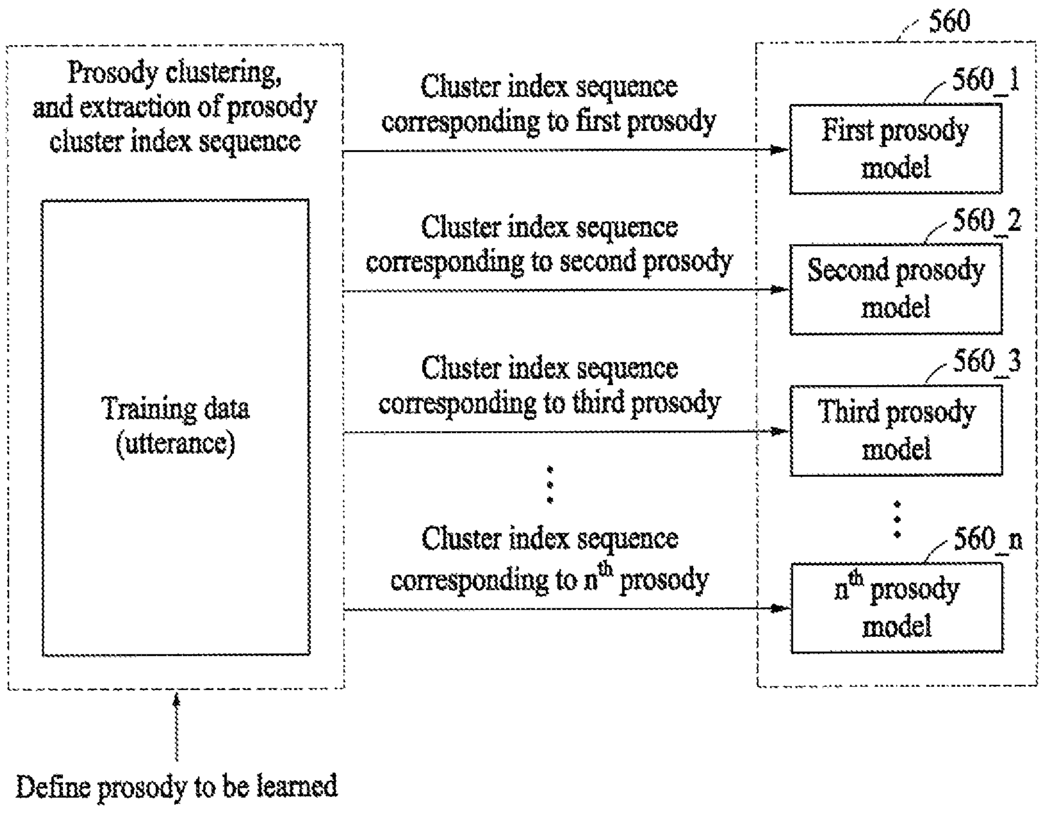
FIG. 9 is a diagram illustrating an example operation of training a prosody model of an electronic device according to certain embodiments.

FIG. 9 is a diagram illustrating an example operation of training a prosody model of an electronic device according to certain embodiments.

Referring to FIG. 9, according to an embodiment, when generating an utterance through the TTS model 540 before training the prosody model 560, prosody of a phoneme to be changed may be defined (or set) as prosody to be manipulated (or controlled) and/or learned through the prosody model 560. Here, one or more prosodies may be defined. The prosody model 560 may include a plurality of prosody models 560_1 through **560_*n* (where n is a natural number greater than or equal to 1) corresponding to respective prosodies, and the prosody models 560_1 through 560_*n*** may be trained in parallel (or independently) for the prosodies.

For example, to change a pitch or an utterance length of a phoneme when generating an utterance, the pitch and the utterance length may be set as first prosody and second prosody, respectively, to be manipulated and/or learned through the prosody model 560. The processor 520 may extract prosody values of the set first prosody and the set second prosody from all utterances included in training data. The processor 520 may perform clustering based on prosody values of the first prosody and extract a cluster index sequence of the first prosody. The processor 520 may perform clustering based on prosody values of the second prosody and extract a cluster index sequence of the second prosody. The processor 520 may train the prosody model 560_1 with the first prosody by inputting the cluster index sequence of the first prosody to the prosody model 560_1 corresponding to the first prosody. The processor 520 may also train the prosody model 560_2 with the second prosody by inputting the cluster index sequence of the second prosody to the prosody model 560_2 corresponding to the second prosody.

Figure 10:
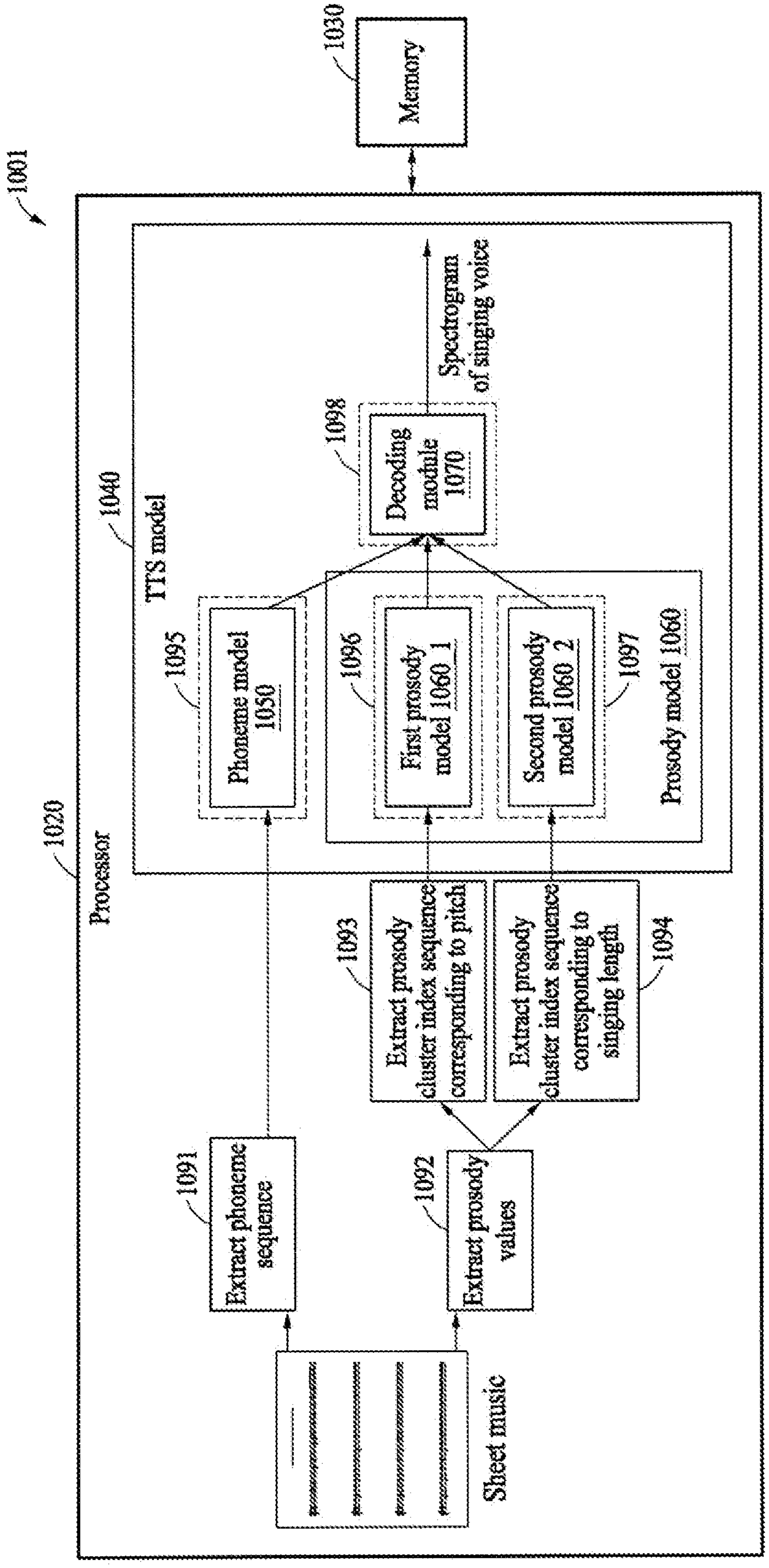
FIG. 10 is a diagram illustrating an example of using a TTS model according to certain embodiments.
Figure 11:
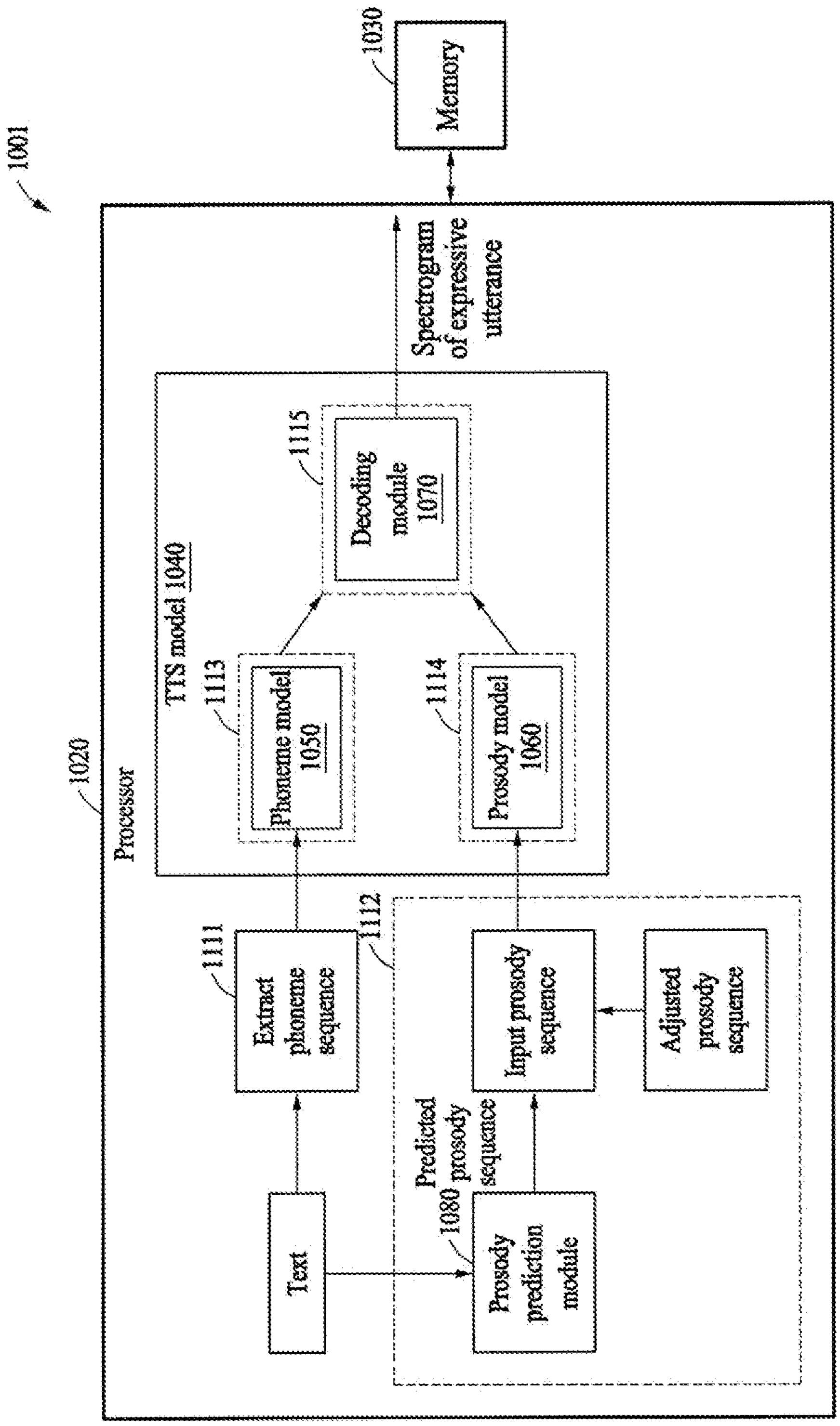
FIG. 11 is a diagram illustrating another example of using a TTS model according to certain embodiments.

FIGS. 10 and 11 describe embodiments in the context of singing.

FIG. 10 is a diagram illustrating an example of using a TTS model according to certain embodiments.

Referring to FIG. 10, according to an embodiment, an electronic device 1001 (e.g., the electronic device 101 of FIG. 1, the electronic device 201 of FIG. 2, the intelligent server 290 of FIG. 2, or the electronic device 501 of FIG. 5) may include at least one processor 1020 (e.g., the processor 120 of FIG. 1, the processor 203 of FIG. 2, or the processor 520 of FIG. 5) and a memory 1030 (e.g., the memory 130 of FIG. 1, the memory 207 of FIG. 2, or the memory 530 of FIG. 5) electrically connected to the processor 1020. The memory 1030 may be executable by the processor 1020, and the processor 1020 may store instructions that allow the processor 1020 to execute a TTS model 1040 (e.g., the TTS model 540 of FIG. 5) configured to control prosody by a unit of a phoneme. The memory 1030 may also store therein the TTS model 1040.

The processor 1020 may perform singing voice synthesis using the TTS model 1040. The TTS model 1040 may be trained through the operations described above with reference to FIGS. 5 through 9. Since information on a length or pitch of a preset character or phoneme is needed for the singing voice synthesis, a prosody model 1060 of the TTS model 1040 may include a first prosody model 1060_1 trained with a pitch and a second prosody model 1060_2 trained with an utterance length (e.g., a singing length). Hereinafter, how the processor 1020 performs the singing voice synthesis using the TTS model 1040 will be described. Operations 1091 through 1098 to be described hereinafter may be performed sequentially, but not be necessarily performed sequentially. For example, the operations 1091 through 1098 may be performed in different orders, and at least two of the operations 1091 through 1098 may be performed in parallel.

Operations may be understood as method steps, or instruction modules executed by the processor.

In operation 1091, the processor 1020 may extract a phoneme sequence corresponding to a lyrics from the lyrics included in sheet music.

In operation 1092, the processor 1020 may extract values of a pitch (e.g., first prosody) at which each lyric needs to be sung from a musical note corresponding to each lyric included in sheet music and values of a singing voice length (e.g., second prosody). In operation 1093, the processor 1020 may extract a prosody cluster index sequence corresponding to the pitch by determining a prosody cluster to which the extracted values of the pitch belong. In operation 1094, the processor 1020 may extract a prosody cluster index sequence corresponding to the singing length by determining a prosody cluster to which the extracted values of the singing length belong.

In operation 1095, the processor 1020 may input a phoneme sequence to a phoneme model 1050, and the phoneme model 1050 may output, to a decoding module 1070, a result (e.g., a length-corrected phoneme characteristic) for the input phoneme sequence. Operations 1095, and 1096 or 1097 may be performed in parallel (or independently).

In operation 1096, the processor 1020 may input the prosody cluster index sequence corresponding to the pitch to the first prosody model 1060_1, and the first prosody model 1060_1 may output, to the decoding module 1070, a result (e.g., ae length-corrected pitch characteristic) for the input prosody cluster index sequence.

In operation 1097, the processor 1020 may input the prosody cluster index sequence corresponding to the singing length to the second prosody model 1060_2, and the second prosody model 1060_2 may output, to the decoding module 1070, a result (e.g., a length-corrected singing length characteristic) for the input prosody cluster index sequence.

In operation 1098, the decoding module 1070 may collect results output respectively from the models 1050, 1060_1, and 1060_2 and perform decoding all at once on a collected result, and then generate a spectrogram including a singing voice of the sheet music as a result of the decoding.

FIG. 11 is a diagram illustrating another example of using a TTS model according to certain embodiments. Operations may be understood as method steps, or instruction modules executed by the processor.

The processor 1020 may generate an expressive utterance using the TTS model 1040. Unlike an utterance generated with average prosody for a text, the expressive utterance generated by the TTS model 1040 may be loaded with various sets of information (e.g., various sets of prosody information) that are not included in the text, in addition to basic information included in the text, as preset words, characters, or phonemes in the text are emphasized or a way of uttering entire sentences is changed to a desired way. The TTS model 1040 may be trained through the operations described above with reference to FIGS. 5 through 9. The TTS model 1040 may include a prosody model trained for each prosody of a phoneme to be changed when generating an utterance. Hereinafter, how the processor 1020 generates an utterance using the TTS model 1040 will be described. Operations 1111 through 1115 to be described hereinafter may be performed sequentially, but not necessarily be performed sequentially. For example, the operations 1111 through 1115 may be performed in different orders, and at least two of the operations 1111 through 1115 may be performed in parallel.

In operation 1111, the processor 1020 may extract, from a text (e.g., an input text), a phoneme sequence corresponding to the text.

In operation 1112, the processor 1020 may obtain a prosody index sequence (e.g., a prosody cluster index sequence) of phonemes constituting the text.

In operation 1113, the processor 1020 may input the phoneme sequence to the phoneme model 1050, and the phoneme model 1050 may output a result (e.g., a length-corrected phoneme characteristic) for the input phoneme sequence to the decoding module 1070.

In operation 1114, the processor 1020 may input the prosody index sequence of the phonemes constituting the text to the prosody model 1060, and the prosody model 1060 may output a result (e.g., a length-corrected prosody characteristic) for the input prosody index sequence to the decoding module 1070.

In operation 1115, the decoding module 1070 may collect results output respectively from the models 1050 and 1060 and perform decoding all at once on a collected result, and then generate a spectrogram (e.g., an expressive utterance spectrogram) of an utterance of the text as a result of the decoding.

In operation 1112, the prosody index sequence of the phonemes constituting the text may include prosody information of the phonemes, and may be a prosody index sequence (e.g., most suitable average prosody information) suitable for the text predicted through a prosody prediction module 1080 or a prosody index sequence in which prosody of a phoneme is arbitrarily adjusted (or set). When using the prosody prediction module 1080, the prosody prediction module 1080 may predict prosody that is most suitable for each phoneme to induce a natural utterance to be generated, even though prosody information (e.g., a prosody index sequence and a prosody cluster index sequence) of each phoneme is not provided as an input. When using a prosody index sequence in which prosody of a phoneme is arbitrarily adjusted (or set), an utterance in which the prosody is adjusted as desired by a user may be generated.

In operation 1112, the prosody index sequence of the phonemes constituting the text may be a combination of the prosody index sequence predicted through the prosody prediction module 1080 and the prosody index sequence in which the prosody of the phoneme is arbitrarily adjusted. To adjust prosody of a designated phoneme, a prosody index sequence in which the prosody of the phoneme is arbitrarily adjusted may be input. In this case, the processor 1020 may change the prosody index sequence by dismissing a prosody index of the phoneme in the prosody index sequence predicted by the prosody prediction module 1080 but replacing it with the arbitrarily adjusted prosody index sequence. That is, an utterance may be generated using the prosody adjusted as desired for the designated phoneme and using the prosody predicted through the prosody prediction module 1080 for remaining other phonemes. Thus, by adjusting the prosody of the phoneme, an utterance that is expressive and natural as a whole may be completed.

According to embodiments described herein, an electronic device (e.g., the electronic device 501 of FIG. 5) may include a memory (e.g., the memory 530 of FIG. 5) storing therein instructions, and a processor (e.g., the processor 520 of FIG. 5) electrically connected to the memory and configured to execute the instructions. When the instructions are executed by the processor, the processor may receive training data comprising a plurality phenomes, determine a prosody value for each one of the plurality of phenomes, cluster the plurality of phenomes based on the prosody value for each one of the plurality of phenomes in the training data, thereby resulting in a plurality of prosody clusters, extract a phenome sequence corresponding to a text in the training data, extract a prosody cluster index sequence corresponding to an utterance of the text by selecting one of the plurality of clusters based on prosody values of the utterance, and generate an TTS model (e.g., the TTS model 540 of FIG. 5) based on the phenome sequence and the prosody cluster index sequence.

The TTS model may comprises a phoneme model and a prosody model. The processor may train the phoneme model (e.g., the phoneme model 550 of FIG. 5) by inputting the phoneme sequence to the phoneme model, and train, in parallel, a prosody model (e.g., the prosody model 560 of FIG. 5) by inputting the prosody cluster index sequence to the prosody model.

When the prosody cluster index sequence includes a prosody cluster index sequence extracted for each prosody, the processor may train a prosody model corresponding to each prosody using the prosody cluster index sequence extracted for each prosody.

The TTS model may include a decoding module (e.g., the decoding module 570 of FIG. 5). The processor may input to the decoding module, a value output from the phoneme model and a value output from the prosody model, thereby training the decoding module.

Each of the prosody clusters may represent a prosody degree.

The prosody values of all of the plurality of the phonemes may include prosody values extracted for all the phonemes for each prosody.

The processor may determine the prosody clusters by performing the clustering on the plurality of phonemes from a distribution of the prosody values of all the phonemes.

The processor may cluster the plurality of phonemes differently based on a prosody characteristic.

The processor may perform the clustering on values of first prosody among the prosody values of all the phonemes regardless of the phonemes, and perform the clustering on values of second prosody among the prosody values of all the phonemes by classifying the values of the second prosody by each phoneme.

The first prosody may include a pitch, and the second prosody may include an utterance length.

According to embodiments described herein, an operation method of an electronic device (e.g., the electronic device 501 of FIG. 5) may include extracting a phoneme sequence corresponding to a text, extracting a prosody cluster index sequence corresponding to an utterance of the text by matching prosody values of the utterance to at least one of a plurality of prosody clusters, wherein each of the plurality of clusters represent a prosody degree, and generating a TTS model (e.g., the TTS model 540 of FIG. 5) based on the phoneme sequence and the prosody cluster index sequence.

The TTS may include a phoneme model (e.g., the phoneme model 550 of FIG. 5) and a prosody model (e.g., the prosody model 560 of FIG. 5). The method may include inputting the phoneme sequence to the phoneme model, thereby training the phoneme model; and inputting the prosody cluster index sequence to the prosody model, thereby training, in parallel, the prosody model. When the prosody cluster index sequence includes a prosody cluster index sequence extracted for each prosody, the training of the prosody model in parallel may include training each prosody model corresponding to each prosody using the prosody cluster index sequence extracted for each prosody.

The TTS model may include a TTS module. The generating may further include training the decoding module (e.g., the decoding module 570 of FIG. 5) by inputting, to the decoding module, a value output from the phoneme model and a value output from the prosody model.

The prosody values of all the phonemes may include prosody values extracted for all the phonemes for each prosody.

The operation method may further include determining the prosody clusters by performing the clustering on all the phonemes based on the prosody values of all the phonemes of the training data.

The determining of the prosody clusters may include performing the clustering on all the phonemes differently based on a prosody characteristic.

The performing of the clustering on all the phonemes differently may include clustering values of first prosody among the prosody values of all the phonemes regardless of the phonemes, and clustering values of second prosody among the prosody values of all the phonemes by classifying the values of the second prosody by each phoneme.

The first prosody may include a pitch, and the second prosody may include an utterance length.

The embodiments herein are provided merely for better understanding of the disclosure, and the disclosure should not be limited thereto or thereby. It should be appreciated by one of ordinary skill in the art that various changes in form or detail may be made to the embodiments without departing from the scope of this disclosure as defined by the following claims, and equivalents thereof

What is claimed is:

1. An electronic device, comprising:

a memory storing therein instructions; and a processor electrically connected to the memory and configured to execute the instructions, wherein, when the instructions are executed by the processor, the processor is configured to:

receive training data comprising a plurality of phonemes;

calculate a prosody value for each one of the plurality of phonemes in the training data;

cluster the plurality of phonemes based on the prosody value for each one of the plurality of phonemes in the training data, thereby resulting in a plurality of prosody clusters;

extract a phoneme sequence corresponding to a text in the training data;

extract a prosody cluster index sequence corresponding to an utterance of the text by selecting one of the plurality of prosody clusters based on prosody values of the utterance of the text; and generate a text-to-speech (TTS) model based on the phoneme sequence and the prosody cluster index sequence, wherein the TTS model comprises a phoneme model, a prosody model that is trained separately from the phoneme model, and a decoding model, wherein the generating the TTS model comprises:

predicting, via the phoneme model, a first length information of a spectrogram frame corresponding to each phoneme of the phoneme sequence based on phoneme characteristics independently from the prosody model, the phoneme characteristics are extracted from the phoneme sequence;

predicting, via the prosody model, a second length information of a spectrogram frame corresponding to each phoneme of the phoneme sequence based on prosody characteristics independently from the phoneme model, the prosody characteristics are extracted from the prosody cluster index sequence;

generating, via the phoneme model, length-corrected phoneme characteristics based on the first length information of the spectrogram frame corresponding to each phoneme of the phoneme sequence;

generating, via the prosody model, length-corrected prosody characteristics based on the second length information of the spectrogram frame corresponding to each phoneme of the phoneme sequence;

generating a spectrogram corresponding to the utterance of the text based on inputting the length-corrected phoneme characteristics and the length-corrected prosody characteristics; and training the phoneme model, the prosody model, and the decoding model based on an error value between the spectrogram corresponding to the utterance of the text and a ground truth spectrogram.

2. The electronic device of claim 1, wherein the processor is configured to:

when the prosody cluster index sequence comprises a prosody cluster index sequence extracted for each prosody, train each prosody model corresponding to each prosody using the prosody cluster index sequence extracted for each prosody, and wherein each cluster of the plurality of prosody clusters includes different phonemes having a matching prosody value.

3. The electronic device of claim 1, wherein each of the plurality of prosody clusters represents a prosody degree.

4. The electronic device of claim 1, wherein the prosody values of all of the plurality of phonemes comprise prosody values of the plurality of phonemes extracted for each prosody.

5. The electronic device of claim 1, wherein the processor is configured to:

determine the prosody clusters from a distribution of the prosody values of the plurality of phonemes by performing the clustering on all the phonemes.

6. The electronic device of claim 1, wherein, the processor is configured to:

cluster the plurality of phonemes differently based on a prosody characteristic.

7. The electronic device of claim 6, wherein the processor is configured to:

perform the clustering on values of first prosody among the prosody values of all the phonemes, regardless of the phonemes; and perform the clustering on values of second prosody among the prosody values of all the phonemes by classifying the values of the second prosody by each phoneme.

8. The electronic device of claim 7, wherein the first prosody comprises a pitch, and the second prosody comprises an utterance length.

9. An operation method of an electronic device, comprising:

extracting a phoneme sequence corresponding to a text;

extracting a prosody cluster index sequence corresponding to an utterance of the text by matching prosody values of the utterance to at least one of a plurality of prosody clusters, wherein each of the plurality of prosody clusters representing a prosody degree, wherein the plurality of prosody clusters are clustered based on a calculated prosody for a plurality of phonemes; and generating a text-to-speech (TTS) model based on the phoneme sequence and the prosody cluster index sequence, wherein the TTS model comprises a phoneme model, a prosody model that is trained separately from the phoneme model, and a decoding model, wherein the generating the TTS model comprises:

predicting, via the phoneme model, a first length information of a spectrogram frame corresponding to each phoneme of the phoneme sequence based on phoneme characteristics independently from the prosody model, the phoneme characteristics are extracted from the phoneme sequence;

predicting, via the prosody model, a second length information of a spectrogram frame corresponding to each phoneme of the phoneme sequence based on prosody characteristics independently from the phoneme model, the prosody characteristics are extracted from the prosody cluster index sequence;

generating, via the phoneme model, length-corrected phoneme characteristics based on the first length information of the spectrogram frame corresponding to each phoneme of the phoneme sequence;

generating, via the prosody model, length-corrected prosody characteristics based on the second length information of the spectrogram frame corresponding to each phoneme of the phoneme sequence;

generating a spectrogram corresponding to the utterance of the text based on inputting the length-corrected phoneme characteristics and the length-corrected prosody characteristics; and training the phoneme model, the prosody model, and the decoding model based on an error value between the spectrogram corresponding to the utterance of the text and a ground truth spectrogram.

10. The operation method of claim 9, wherein the training of the prosody model comprises:

when the prosody cluster index sequence comprises a prosody cluster index sequence extracted for each prosody, training each prosody model corresponding to each prosody using the prosody cluster index sequence extracted for each prosody, and wherein each cluster of the plurality of prosody clusters includes different phonemes having a matching prosody value.

11. The operation method of claim 9, wherein prosody values of all phonemes comprise prosody values of all the phonemes extracted for each prosody.

12. The operation method of claim 9, further comprising:

determining the prosody clusters by performing clustering on all phonemes in training data based on the prosody values of all the phonemes in the training data.

13. The operation method of claim 12, wherein the determining of the prosody clusters comprises:

performing the clustering on all the phonemes differently based on a prosody characteristic.

14. The operation method of claim 13, wherein the performing of the clustering differently comprises:

clustering values of first prosody among the prosody values of all the phonemes, regardless of the phonemes; and clustering values of second prosody among the prosody values of all the phonemes by classifying the values by each phoneme.

15. The operation method of claim 14, wherein the first prosody comprises a pitch, and the second prosody comprises an utterance length.

16. A non-transitory computer-readable storage medium storing instructions that, when executed by a processor, cause the processor to perform the operation method of claim 9.

* * * * *